(12) United States Patent
Lucht et al.

(10) Patent No.: US 7,280,268 B2
(45) Date of Patent: Oct. 9, 2007

(54) INJECTION-SEEDED OPTICAL PARAMETRIC OSCILLATOR AND SYSTEM

(75) Inventors: Robert P. Lucht, West Lafayette, IN (US); Waruna D. Kulatilaka, West Lafayette, IN (US); Thomas N. Anderson, Seguin, TX (US); Thomas L. Bougher, Dublin, OH (US)

(73) Assignee: Purdue Research Foundation, West Lafayette, IN (US)

( * ) Notice: Subject to any disclaimer, the term of this patent is extended or adjusted under 35 U.S.C. 154(b) by 267 days.

(21) Appl. No.: 11/173,173

(22) Filed: Jul. 1, 2005

(65) Prior Publication Data

US 2006/0078011 A1 Apr. 13, 2006

Related U.S. Application Data

(60) Provisional application No. 60/585,805, filed on Jul. 6, 2004.

(51) Int. Cl.
*G02F 1/39* (2006.01)

(52) U.S. Cl. .................................... 359/330

(58) Field of Classification Search ........ 359/326–330; 372/21, 75
See application file for complete search history.

(56) References Cited

U.S. PATENT DOCUMENTS 6,804,044 B2 * 10/2004 Van Der Veer ............. 359/330

2006/0013272 A1 * 1/2006 Kopf et al. ................... 372/30

OTHER PUBLICATIONS

Baxter et al., "Laser spectroscopy with a pulsed, narrowband infrared optical parametric oscillator system: a practical, modular approach", *Appl. Phys. B*, Springer-Verlag 1998, pp. 653-657, vol. 66.

Baxter et al., "Spectroscopic diagnostics of chemical processes: applications of tunable optical parametric oscillators", *Appl. Phys. B*, 2000, pp. 651-663, vol. 71.

Borsutzky, "Frequency control of pulsed optical parametric oscillators", *Quantum Semiclass. Opt.*, 1997, pp. 191-207, vol. 9.

Chen et al., "Continuous-wave 4.3-μm intracavity difference frequency generation in an optical parametric oscillator", *Optics Letters*, Jan. 1, 2001, pp. 25-27, vol. 26, No. 1.

DRAG et al., "Temporal behavior of a high repetition rate infrared optical parametric oscillator based on periodically poled materials", *Appl. Phys. B*, Springer-Verlag 2001, pp. 195-200, vol. 73.

HE et al., "Locking the cavity of a pulsed periodically poled lithium niobate optical parametric oscillator to the wavelength of a continuous-wave injection seeder by an 'intensity-dip' method", *Review of Scientific Instruments*, Aug. 1999, pp. 3203-3213, vol. 70, No. 8.

(Continued)

*Primary Examiner*—Hemang Sanghavi
(74) *Attorney, Agent, or Firm*—Brinks Hofer Gilson & Lione

(57) ABSTRACT

Optical parametric oscillators (OPO) and systems are provided. The OPO has a non-linear optical material located between two optical elements where the product of the reflection coefficients of the optical elements are higher at the output wavelength than at either the pump or idler wavelength. The OPO output may be amplified using an additional optical parametric amplifier (OPA) stage.

21 Claims, 8 Drawing Sheets

OTHER PUBLICATIONS

HE et al., "Spectroscopic Applications of Optical Parametric Oscillators", *Optics & Photomics News*, May 2002, pp. 56-60, 76.

Kulatilaka et al., "Development of injection-seeded, pulsed optical parametric generator/oscillator systems for high-resolution spectroscopy", *Appl. Phys. B*, Springer-Verlag 2005, pp. 669-680, vol. 80.

Lefebvre et al., "Transient grating induced by single-shot time-domain coherent anti-Stokes Raman scattering: application to velocity measurements in supersonic flows", *J. Opt. Soc. Am. B*, Mar. 1996, pp. 514-520, vol. 13, No. 3.

Lefebvre et al., "Raman injected optical parametric oscillator", *Optics Communications*, 1997, pp. 241-246, vol. 139.

Scherrer et al., "Dual-cavity doubly resonant optical parametric oscillators: demonstration of pulsed single-mode operation", *J. Opt. Soc. Am. B*, Oct. 2000, pp. 1716-1729, vol. 17, No. 10.

\* cited by examiner $T_{DIODE}, \lambda_{DIODE}$ 37.84 °C
1535.737 nm 37.94 °C
1535.747 nm 38.05 °C
1535.757 nm 38.73 °C
1535.821 nm

INJECTION-SEEDED OPTICAL PARAMETRIC OSCILLATOR AND SYSTEM

This application claims the benefit of priority to U.S. provisional application No. 60/585,805, which was filed on Jul. 6, 2004, and is incorporated herein by reference.

FEDERALLY SPONSORED RESEARCH OR DEVELOPMENT

This research was supported by the National Science Foundation under Grant No. CTS-0113206, and by the U.S. Department of Energy under Grant No. DE-FG03-99ER14997.

TECHNICAL FIELD

An aspect of this application relates to laser parametric oscillators and systems using the same.

BACKGROUND

Existing Nd:YAG-pumped dye lasers or optical parametric oscillators may be used for combustion diagnostic techniques such as absorption spectroscopy, cavity ring-down spectroscopy (CRDS), laser-induced fluorescence (LIF), laser-induced polarization spectroscopy (LIPS), and degenerate four-wave mixing (DFWM). These existing sources typically have frequency bandwidths of the order of 3 GHz and exhibit multiple longitudinal frequency modes. The use of these multi-longitudinal-mode laser sources can cause numerous complications in signal analysis and greatly increase pulse-to-pulse signal fluctuations in techniques such as LIPS and CRDS.

Injection-seeded $LiNbO_3$ optical parametric oscillators (OPO) with a resonant cavity locked to the frequency of the seed beam have been developed. However, the injection-seeding laser source is a continuous wave (cw) Nd:YAG laser and is not tunable. An OPO with beta-barium-borate ($\beta$-BBO) crystals has also been developed. This OPO system was pumped with the 355-nm third-harmonic beam from a single-mode Nd:YAG laser, and injection seeding with the pulsed 532-nm and 1064-nm beams from the same laser was also demonstrated. One attempt has seeded an OPO with a tunable cw color center laser at 1500 nm. The cavity was locked to the frequency of the seed laser beam. Other attempts have used a cw titanium-doped sapphire laser to seed an actively-locked ring cavity OPO.

Other related developments include injection-seeded systems with cavities resonant at the seed wavelength, and cavities that incorporate periodically poled lithium niobate (PPLN) crystals. A high-resolution OPO that is seeded with a continuous wave (cw) ring dye laser has also been demonstrated. High-resolution, injection-seeded OPO and optical parameter generator (OPG) systems have been developed for infrared differential absorption spectroscopy. Single-mode, tunable pulsed systems in which an external-cavity diode laser is used to injection seed a modeless dye laser are known, as well as systems that utilize four $\beta$-BBO crystals, but without a resonant cavity, injection-seeded with an 810-nm ECDL at the idler wavelength. One advantage of this system is that the operation of the system is simpler, although the use of four $\beta$-BBO crystals is required to obtain output pulse energies of several millijoules.

Thus, there is a need for a compact, affordable laser source for the generation of tunable, high-resolution pulsed radiation over a wide range of wavelengths which would be a major step forward in the field of combustion diagnostics and for other laser spectroscopic applications.

SUMMARY

This application relates to injection-seeded optical parametric laser (OPL) systems. Both optical parametric generator (OPG) and optical parametric oscillator (OPO) systems are described. The OPG and OPO systems are based on 355-nm pumping of two counter-rotating, non-linear beta barium borate ($\beta$-BBO) crystals. The 355-nm pump laser radiation is the third-harmonic output from a injection-seeded pulsed Nd:YAG laser. The OPG and OPO systems may be seeded using a near-infrared distributed feedback (DFB) diode laser. Tunable laser radiation from the OPG or the OPO systems may then amplified in an optical parametric amplifier (OPA) which may comprise two counter-rotating $\beta$-BBO crystals pumped by 355-nm laser radiation. In this system, the injection seeding may be accomplished with a near-infrared DFB diode laser at the idler wavelength.

An OPO system comprising two counter-rotating $\beta$-BBO crystals in a cavity that is not actively locked is also described. The cavity may be formed by using two mirrors to produce optical feedback at the signal wavelength. The mirrors may have a reflectivity that is a function of wavelength. In one aspect, one of the two flat mirrors may have 100% reflectivity at the output signal wavelength, but low reflectivity at the pump and idler (seed) wavelengths. The other flat mirror may serve as the output coupler, and may be one of a mirror having about 70% reflectivity at the signal wavelength and a wedged, uncoated glass flat, or a mirror having a reflectivity whose value lies between the examples given. The product of the reflectivities of the mirror pair at the pump and idler wavelengths may be substantially lower that that which obtains at the output signal wavelength; for example, of the order of about 0.004. The exact value is not believed to be critical.

For both the OPG and OPO systems the idler and signal output radiation may be single-mode with a frequency bandwidth of 200-250 MHz for the configurations described. The systems are easily tuned by tuning the wavelength of the DFB seed laser, and power conversion efficiency of approximately 10% has been demonstrated with each system when coupled with an OPA system.

OPG and OPO systems that are injection seeded at the idler wavelength using a near-infrared distributed feedback (DFB) diode laser are also demonstrated. The basis for the operation of both of these optical parametric laser (OPL) systems is the observation that a significant enhancement of the signal and idler intensities in a single $\beta$-BBO crystal can be obtained when the optical parametric process is initiated at the idler wavelength without the use of a resonant cavity at the idler wavelength.

The OPL system technology that is described may be used, for example, but not by way of limitation, in quantitative application of pulsed cavity ring-down spectroscopy and nonlinear techniques such as LIPS, DFWM, and CARS spectroscopy. In addition, the availability of such a high-resolution laser source may also increase the potential for obtaining additional thermodynamic information such as temperature and pressure from linear techniques such as absorption spectroscopy and LIF because the laser line width will be in general be much smaller than resonance line widths and molecular line shapes will be fully resolved. These laser systems may also be useful for measurement of fundamental atomic and molecular spectroscopic and energy transfer parameters.

The idler signal output from the OPO may also used as an input beam in the OPA. The conversion efficiency and beam quality of the system may be further improved by matching pump and signal (or idler) in/out beam sizes in the OPA. The use of a spatial filter between the OPO and OPA stages may be effective as a means of optimizing the spatial beam quality of the system.

A range of output wavelengths may be obtained by additional processes such as frequency doubling, up-conversion and down-conversion.

DETAILED DESCRIPTION

Figure 1:
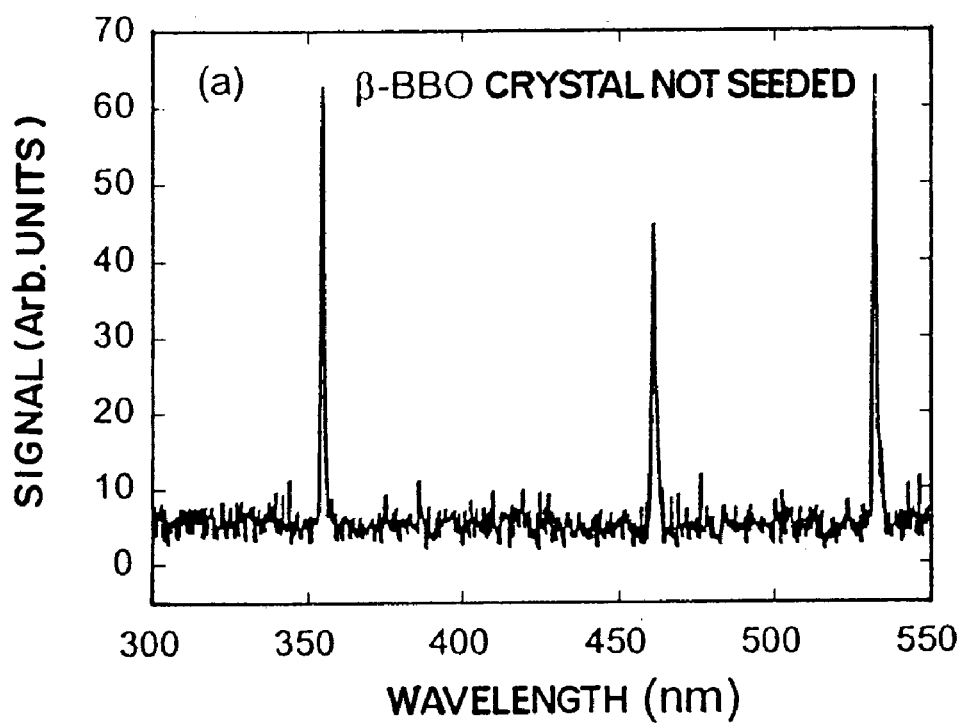
FIG. 1 shows a spectrum of light emitted from (A) the unseeded β-BBO crystal and (B) the seeded β-BBO crystal with 355 nm pumping.
Figure 1:
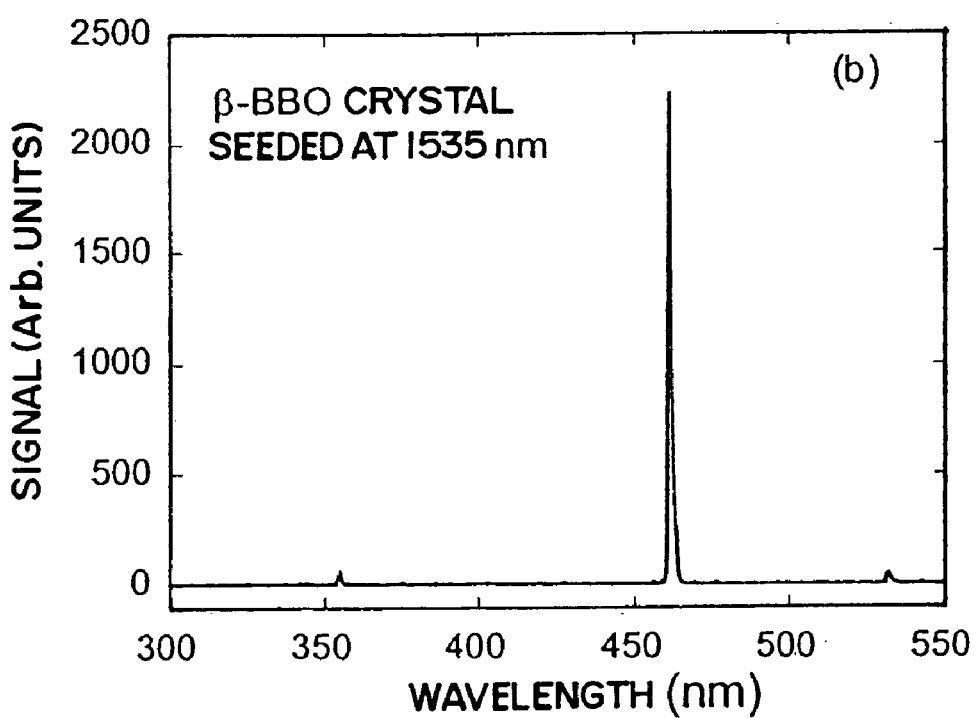

While the invention is susceptible to various modifications and alternative forms, specific embodiments have been shown by way of example in the drawings and will be described in detail herein. Like numbered elements in the same or different drawings perform equivalent functions.

The generation of signal and idler radiation with significant intensity from an injection-seeded β-BBO crystal was demonstrated using a 1535-nm DFB diode laser for a seed laser source. The β-BBO crystal was pumped with 120 mJ of 355-nm laser radiation from a Nd:YAG laser (Spectra-Physics Model Quanta Ray Pro 290-10) optimized for the pumping of optical parametric systems. The pump pulse was approximately 8 nsec in duration and the pump beam diameter was approximately 4 mm in the β-BBO crystal. The β-BBO crystal is 12 mm long and 8 mm×10 mm in cross section normal to the beam propagation direction. The DFB diode laser (Lucent Technologies Model D2525P53) produces approximately 10 mW of single longitudinal mode (SLM) output in the spectral region from 1534 nm to 1538 nm. In an example, the beam from the fiber-coupled DFB laser was collimated using a single positive lens and was approximately 3 mm in diameter at the β-BBO crystal.

The signal output from the β-BBO crystal was monitored using an Ocean Optics fiber-coupled spectrometer (Model USB2000). The unseeded signal output was detected over a wide range of wavelengths, ranging from about 400 nm greater than 600 nm. The OPG signal peak wavelength changes as the β-BBO crystal angle is varied. The "unseeded" signal output increased significantly at a wavelength of 532 nm due to seeding from residual 1064-nm photons present in the 355-nm pump beam. The unseeded spectrum of the system for a β-BBO crystal angle corresponding to a signal wavelength of 461 nm is shown in FIG. 1a. Peaks in the spectrum are evident at the signal wavelength of 461 nm, at the wavelength of 355 nm from pump photons that are transmitted through a 355 nm mirror and two thick glass plates that serve to attenuate the 355-nm beam, and at 532 nm due to the residual 532 nm photons in the 355 nm beam. For this example, the idler wavelength was 1535 nm. Although the 461 nm beam was detected with the spectrometer, it was not visible with the naked eye.

Figure 2:
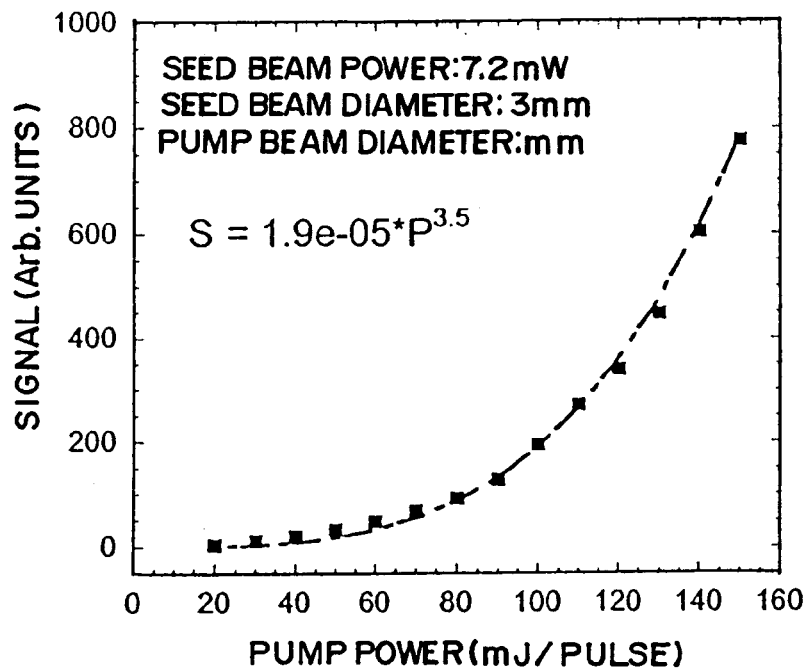
FIG. 2 shows the intensity of the signal output from the seeded β-BBO crystal as a function of the pulse energy of the 355 nm pump beam.

The intensity of the signal beam at 461 nm increased significantly when the β-BBO crystal was seeded. The detected spectrum for this example is shown in FIG. 1b. The signal intensity at 461 nm increased by approximately a factor of 100 and the blue signal beam was visible with the naked eye. When the seed beam was blocked, the 461-nm intensity decreased substantially and the beam was no longer visible. Thus, threshold for pulsed OPG operation by using a 10 mW seed beam at the idler wavelength, even without using a locked cavity to increase the initial seed intensity within the crystal was substantially decreased. The dependence of the signal intensity from the single-crystal OPG on pump pulse energy is shown in FIG. 2; the observed signal intensity is proportional to the pump pulse energy raised to the power of 3.5.

Figure 3:
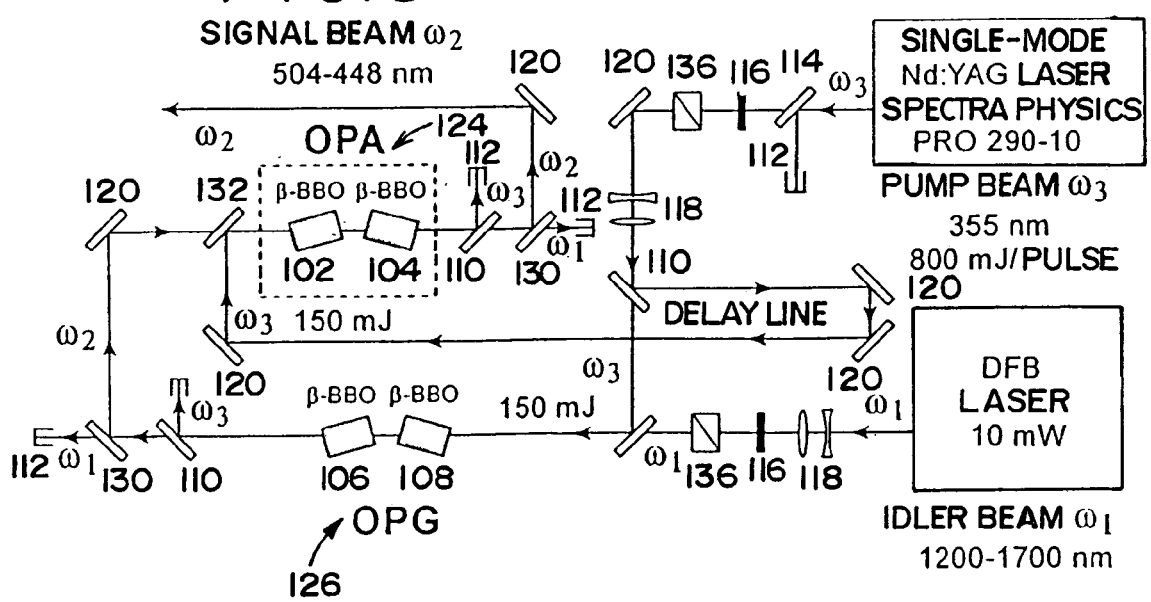
FIG. 3 is a schematic diagram of a OPG/OPA system.

An optical parametric generator/optical parametric amplifier (OPG/OPA) system is shown in FIG. 3. Four β-BBO crystals 102, 104, 106, 108 are used in the OPG/OPA system. The 355 nm third-harmonic pump beam $\omega_3$ is emitted by a pump laser, which may be a single-mode Nd:YAG laser such as Spectra Physics Model PRO 290-10 (Mountain View, Calif.).

In order to prevent damage to the optical elements of the system and to regulate the power of the pump as input to the successive optical elements, the Nd:YAG laser signal at frequency $\omega_3$ is passed through a 50/50 beamsplitter 114. One of the beams is directed towards a beam dump 112 where it is dissipated or scattered. The second beam is directed towards a half-wave plate 116 and a polarizer 136, which may be adjusted to further attenuate the beam. The beam is then directed through a collimating lens assembly 118 by a mirror 120. The pump beam is then divided in two by a 50/50 beamsplitter 110, and a first portion is directed to an arrangement of mirrors 120 and a dichroic mirror 132, disposed such that the first portion is directed to the input of the OPA 124. The time delay introduced by this arrangement is such that the first portion of the pump pulse arrives at the same time as a second portion of the pump pulse, which is directed through the OPG 126 prior to being input to the OPA 124. The second portion of the pump pulse is directed to an input of the OPG 126 by a dichroic mirror 128.

The output of the OPG is comprised of energy at wavelengths $\omega_1$, $\omega_2$, and $\omega_3$, where $\omega_1$ and $\omega_3$ are represented in the input beams, and $\omega_2$ is energy produced by the non-linear operation of the β-BBO crystals 106, 108 of the OPG 126. Wavelengths $\omega_1$ and $\omega_3$ are each diverted to a dump 112 by dichroic mirrors 130 and 110, respectively, and the remaining energy at $\omega_2$ is directed to the input of OPA 124 by mirror 120 and dichroic mirror 132, such that the beam is collinear with the time-delayed first portion of the pump pulse.

At the output of the OPA 124, the energy at $\omega_3$ is directed to dump 112 by dichroic mirror 110 and the energy at $\omega_1$ is directed to dump 112 by dichroic mirror 130. The remaining energy at $\omega_2$, represents the signal beam and is directed to the apparatus output by mirror 120.

Up to 150 mJ/pulse of the 355 nm pulse energy was used to pump the OPG/OPA system in each stage, or a total of 300 mJ/pulse. A signal pulse energy of approximately 18 mJ/pulse at 461 nm from the OPG/OPA system was demonstrated, although the power output of the system has not been optimized by, for example, matching the beam sizes of the pump and signal idler beams in the OPA.

The frequency spectrum of the laser radiation from the OPG system was analyzed using a solid etalon at the signal wavelength and by recording the absorption line shape for low-pressure acetylene at the idler wavelength. The solid etalon has a free spectral range (FSR) of 10 GHz and a finesse of approximately 15-20. The wavelength scan of the DFB seed laser from 1535.737 to 1535.821 nm corresponds to a frequency scan of 10.67 GHz.

Figure 4:
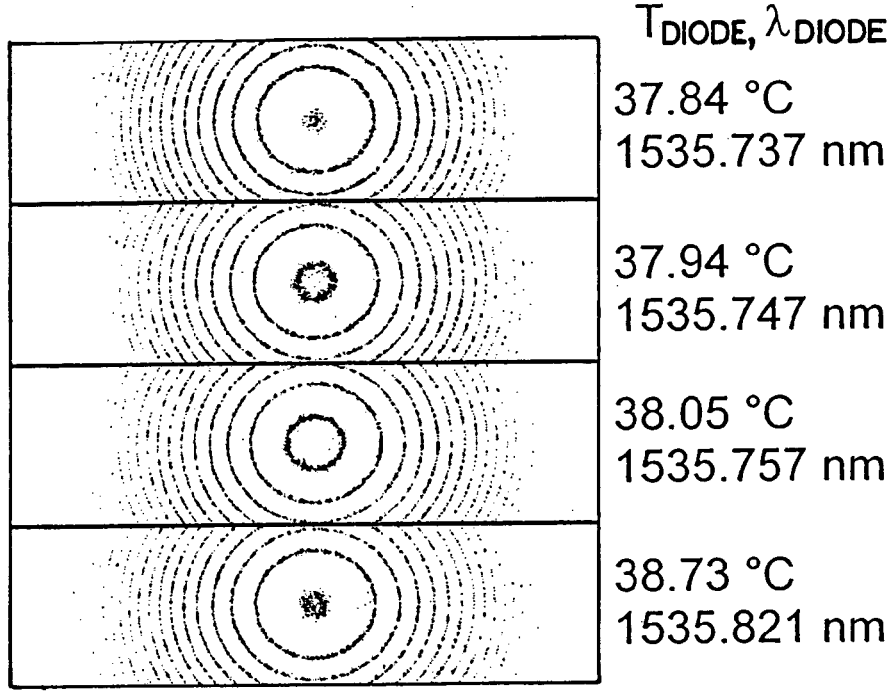
FIG. 4 shows the imaging of the transmission pattern of the OPG/OPA signal beam through a solid etalon as the DFB seed laser is tuned.

The focused transmission pattern from the etalon was detected using a back-illuminated CCD camera (Andor Technology, South Windsor, Conn., Model DU440-BU). The etalon patterns for the OPG/OPA system are shown in FIG. 4 for different DFB temperatures and wavelengths as the DFB is scanned through a little more than one etalon FSR. The DFB diode laser wavelength may be tuned by varying either the diode temperature or current via computer control of the diode laser controller (ILX Lightwave, Bozeman, Mont., Model LDC-3714B). A ring pattern observed as the DFB laser was scanned and the wavelength changes were smooth and continuous. As is evident from FIG. 4, the rings in the etalon pattern are narrow and there is excellent contrast between the rings and the dark regions between the rings. The estimated spectral resolution of the etalon is approximately 500 MHz, which value sets an upper limit on the frequency bandwidth of the signal radiation from the OPG.

The frequency bandwidth of the idler radiation was measured by performing absorption measurements for low-pressure acetylene. A series of absorption measurements was performed with the DFB diode laser to characterize the near-infrared acetylene absorption. The DFB laser was tuned to the P(15) transition in the $v_1+v_3$ band at 6518.4858 cm$^{-1}$.

An 8-cm-long gas cell was filled with pure acetylene at pressures ranging from 0.13 kPa to 2.67 kPa, and a series of absorption spectra were measured with the DFB laser. Theoretical spectra were fit to the experimental spectra using the resonance Doppler width of 471 MHz and the specified 10 MHz frequency bandwidth of the DFB laser. The theoretical absorption spectra were calculated by convolving the resonance line shape with a laser frequency spectrum with the indicated frequency bandwidth (FWHM). The resonance line profile is assumed to be given by a Voigt profile and the laser frequency spectrum is assumed to have a Gaussian line shape.

The collisional broadening factor for the line was determined to be 141 MHz/kPa from these high-resolution absorption measurements. The acetylene lines were essentially fully Doppler broadened at acetylene pressures below 0.50 kPa.

Figure 5:
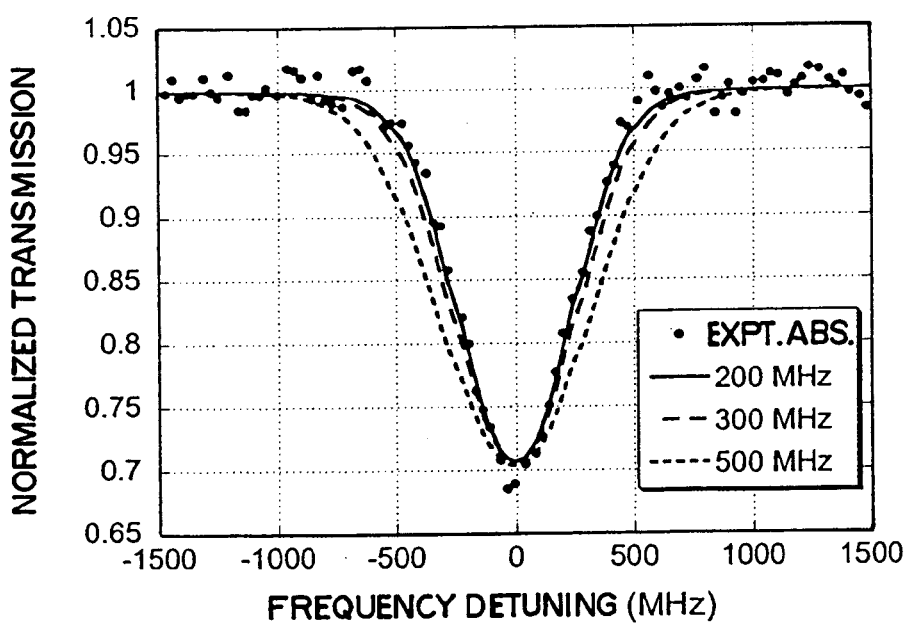
FIG. 5 shows an absorption spectrum from the P(15) resonance in the $v_1+v_3$ band of acetylene at 0.40 kPa (3 Torr) recorded using the pulsed idler output from the OPG/OPA.

Absorption spectra were then recorded using the pulsed idler radiation from the OPG. Theoretical spectra were calculated with different values for the frequency bandwidth of the pulsed idler radiation and compared to the experimental spectra and the results are shown in FIG. 5. The best fit to the experimental spectrum was for the theoretical spectrum with a laser frequency bandwidth of 200 MHz full-width-at-half-maximum (FWHM), although a spectrum with a bandwidth of 100 MHz may be said to fit nearly as well. The results of the high-resolution absorption measurements thus indicate that the frequency bandwidth of the idler radiation is 200 MHz, with an uncertainty of approximately 50 MHz. The frequency bandwidth of the 1064-nm output of the Q-switched Nd:YAG laser is listed as 100 MHz in the laser specification sheet, and this sets a lower limit on the expected frequency bandwidth for the 355-nm pump, signal, and idler radiation.

Figure 6:
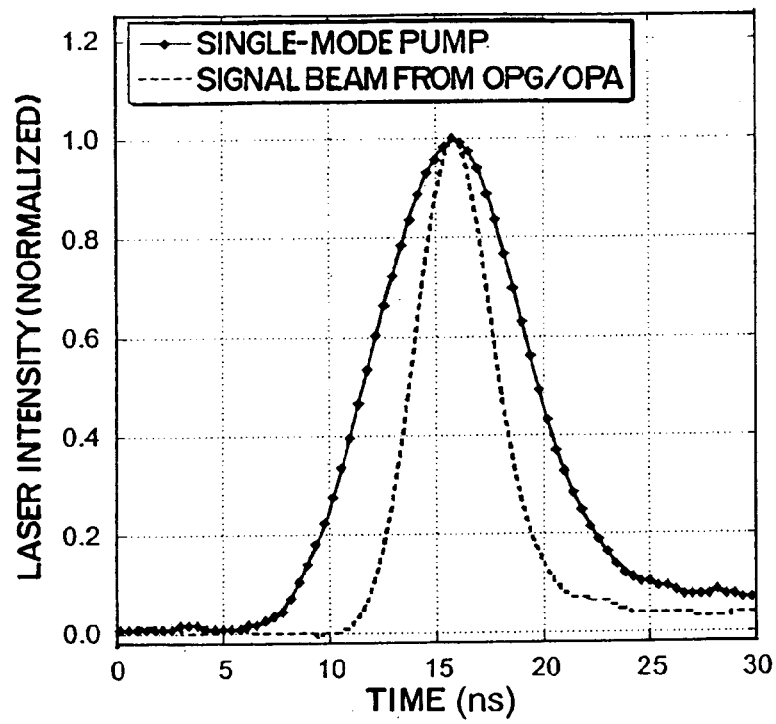
FIG. 6 shows a measured temporal profile for the 461 nm signal beam from the injection-seeded OPG/OPA system compared to a temporal profile of the single-mode 355-nm pump laser.

A single-mode characteristic of the laser radiation is also inferred from the temporal shape of the signal laser pulse. The temporal shapes of the 355 nm pump pulse and the 461-nm signal pulse are shown in FIG. 6. The temporal FWHM of the pump pulse is 8 nsec and the injection-seeded pump pulse has a smooth near-Gaussian shape. The signal pulse is also smooth and near-Gaussian, with a shorter temporal FWHM of approximately 4-5 nsec. For the near-Gaussian 4-5 nsec pulse, the Fourier transform limit for the frequency bandwidth (FWHM) is approximately 100 MHz. The frequency bandwidth for the signal and idler output of the OPG appears to be within a factor of two of the Fourier transform limit.

Figure 7:
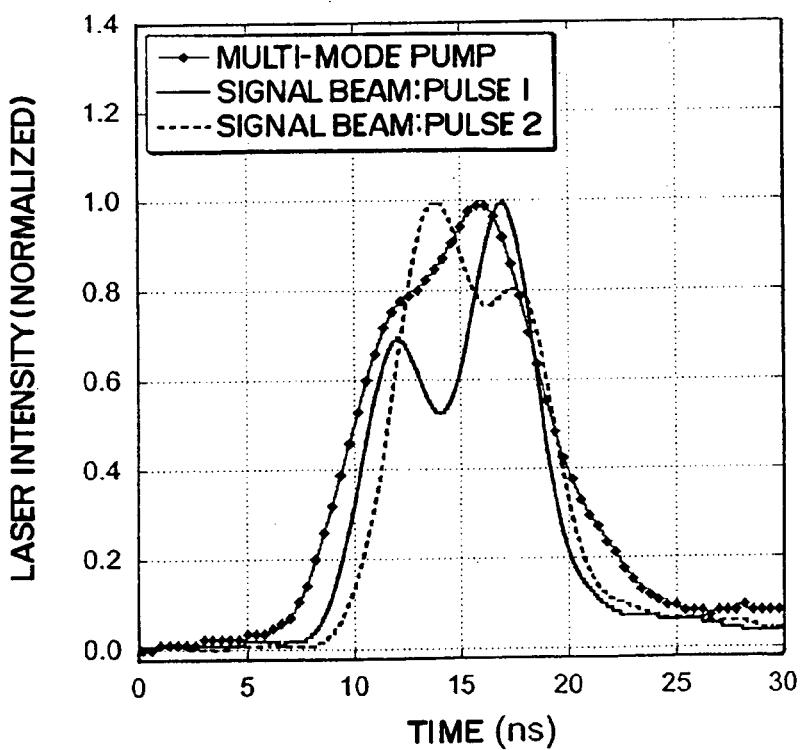
FIG. 7 shows measured temporal profiles for the 461 nm signal beam from the injection-seeded OPG/OPA system compared to the temporal profile of the multi-mode 355 nm pump laser.

The OPG/OPA system was also operated with a multi-mode Nd:YAG laser to determine if multi-mode behavior of the system could be observed from the shape of the temporal profile. As is evident from FIG. 7, the temporal profile for the 355 nm pump beam was not as smooth and near-Gaussian as for the single-mode pump beam. The observed signal beam temporal profiles are different for the case of a multi-mode pump and exhibit distinct temporal lobes separated by approximately 5 nsec; this may indicate that mode-beating in the OPG is occurring between two or more frequencies separated by 0.2 GHz. This result corresponds with the expected frequency mode spacing in the 0.7-m long Nd:YAG laser cavity. Mode-beating in the signal beam temporal profile is pronounced, indicating that fewer modes have significant intensity than for the 355-nm pump beam. This result may be expected given the extreme dependence of the signal intensity for the OPG on pump laser power shown in FIG. 2.

Figure 8:
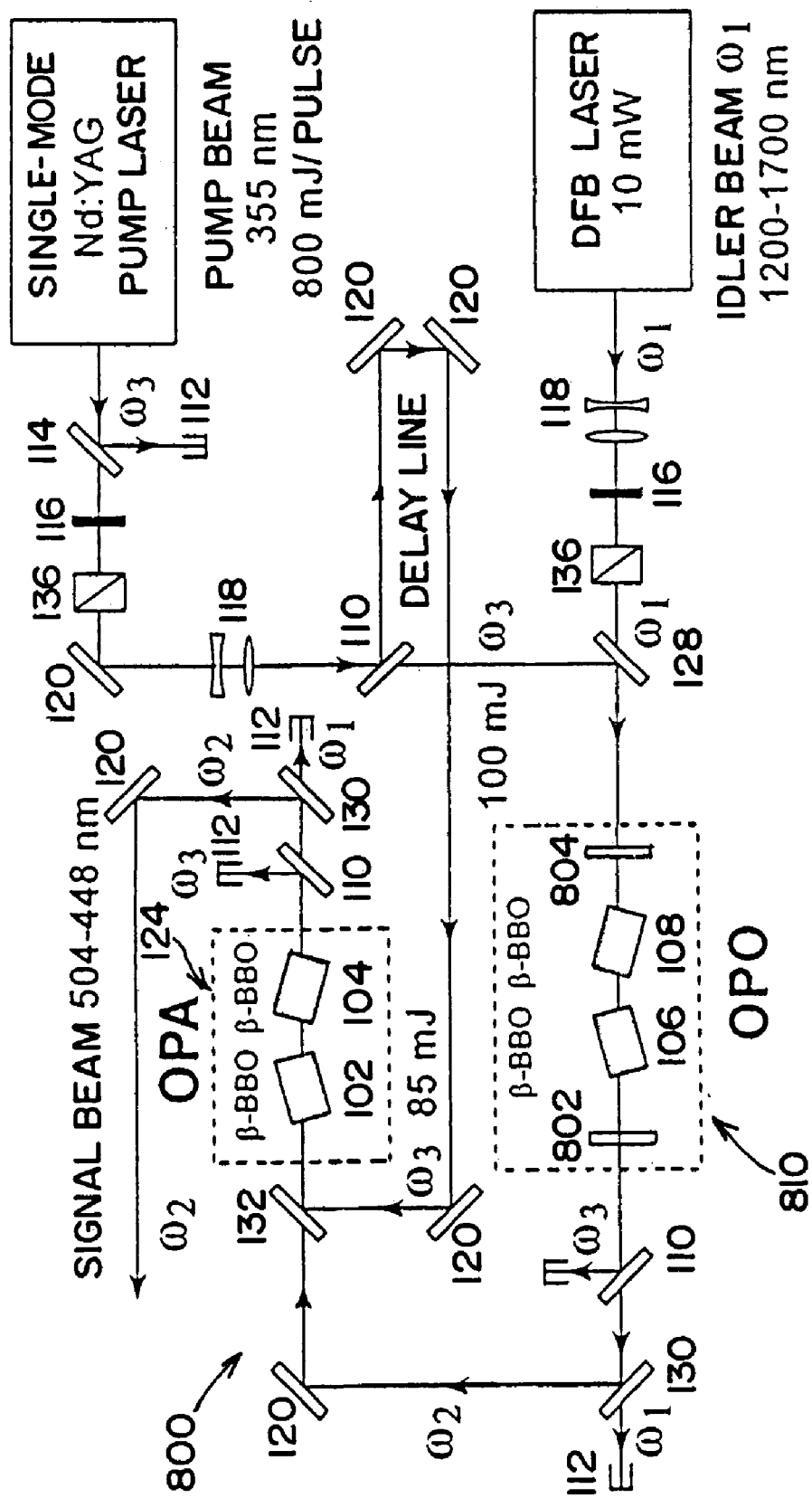
FIG. 8 is a schematic diagram of the OPO system with the cavity designed for feedback at the signal wavelength.

A schematic diagram of an optical parametric oscillator and amplifier (OPO/OPA) system is shown in FIG. 8. The apparatus is similar to that shown in FIG. 3, but the OPG 126 is replaced by an OPO 810. Except for the features of the OPO 810, the description of the apparatus corresponds to that of FIG. 3, and will not be repeated.

The OPO 108 is comprised of β-BBO crystals 106 and 108, with a first mirror 802 and a second mirror 804 disposed at the output and the input of the β-BBO crystals. The mirrors provide feedback at the signal wavelength $\omega_2$ but transmit the idler wavelength $\omega_1$ and the pump wavelength $\omega_3$. In an example, the second mirror 804 has a reflectivity of substantially 100% at the signal wavelength $\omega_2$. The first mirror 802 is used as an output coupler. Both a flat mirror with a reflectivity of 70% at the signal wavelength $\omega_2$, and a wedged glass flat have been used for this purpose. The system with the 70% mirror will be referred to as the high-finesse OPO and the system with the wedged glass flat as the low-finesse OPO. Although the mirrors provide a cavity with feedback properties at the signal wavelength $\omega_2$, the dimensions of the cavity are not critical, nor are the cavity dimensions actively controlled. The reflectivity of the mirror may be adjusted to optimize the system, as both high and low reflectivity examples have been demonstrated.

Figure 9:
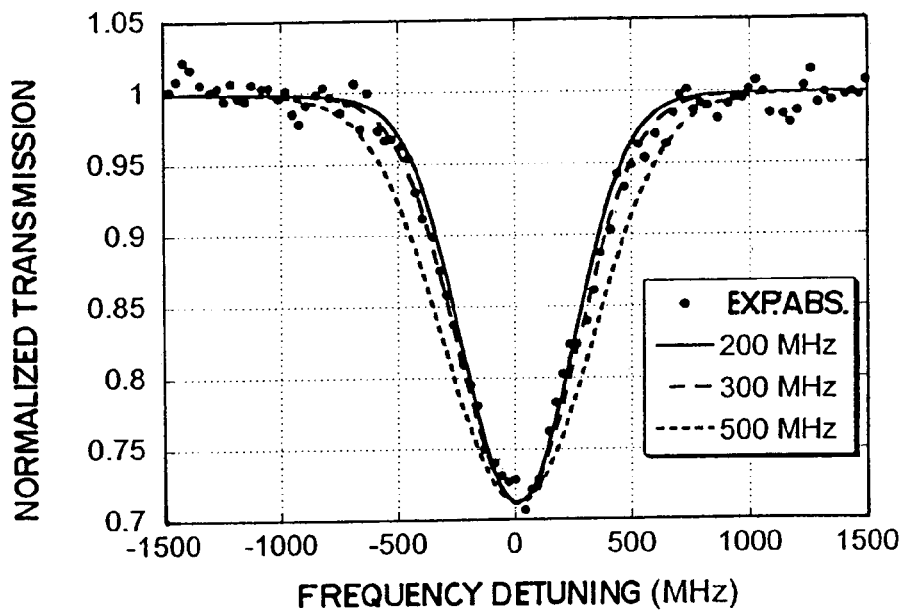
FIG. 9 shows an absorption spectrum from the P(15) resonance in the $v_1+v_3$ band of acetylene at 0.40 kPa (3 Torr) recorded using the pulsed idler output from the OPO.

In an example, the high-finesse OPO was injection-seeded using the 1535-nm DFB diode laser. For the high-finesse OPO, one might expect that the frequency spectrum of both the signal and idler radiation would be broadened unless the cavity length was actively controlled so that the generated signal frequency matched a cavity resonance frequency. However, as confirmed by absorption measurements of low-pressure acetylene, the frequency spectrum of the laser radiation is determined by the injection-seeding process and the bandwidth of the laser radiation was not increased significantly by the feedback at the signal wavelength provided by the high-reflectivity mirrors. The absorption spectrum obtained by tuning the frequency of the pulsed high-finesse OPO idler radiation through the P(15) transition in the $v_1+v_3$ band at 6518.4858 cm$^{-1}$ is shown in FIG. 9. Theoretical absorption spectra are calculated by convolving the resonance line shape with a laser frequency spectrum with the indicated frequency bandwidth (FWHM). The resonance line profile is assumed to be given by a Voigt profile and the laser frequency spectrum is assumed to have a Gaussian line shape.

From the results shown in FIG. 9, the frequency bandwidth of the idler radiation (shown as points) from the OPO may be slightly greater than the frequency bandwidth from the OPG, approximately 300 MHz instead of 200 MHz. However, it is clearly less than 500 MHz as is seen from comparison with computed absorption spectra.

For the two-crystal high-finesse OPO, 2 mJ of signal radiation at 461 nm were obtained, as measured with a power meter (Molectron Detector, Inc. Portland, Oreg., Model MAX500A), for 100 mJ of 355-nm pulse energy in a 4-mm-diameter pump beam. For the same pump beam diameter and pulse energy, the energy output of the OPG could not be measured using this same power meter. In the OPA stage, the 2 mJ signal beam was injected and the measured pulse energy of the amplified signal beam was 8 mJ for 85 mJ of 355-nm pulse energy in the OPA. The diameter of the 355-nm beam in the OPA was 5.5 mm.

In another example, the 1535-nm DFB seed laser of FIG. 8 was replaced with a 1313-nm seed laser (NEL America, Inc., Saddle Brook, N.J., Model NLK1B5G1AA). The signal beam at 486 nm may be frequency doubled and used as the pump beam. The 1313-nm DFB laser was plugged into the same diode mount (ILX Ligthwave, Model LDM4984) that was used for the 1535 nm DFB laser. For the OPO system seeded with the 1313-nm DFB seed laser, the 70% output coupler may be replaced with a wedged glass flat. A very low-finesse cavity for the signal wavelength may reduce the effects of the cavity resonances on the frequency bandwidth of the idler and signal radiation, and increase the frequency stability compared to a high-finesse OPO system. Even more pulse energy at the signal wavelength $\omega_2$ was obtained with the low-finesse OPO, 6 mJ/pulse, than from the higher finesse OPO. This signal beam was then amplified in the OPA system, resulting in 12 mJ/pulse at the signal wavelength $\omega_2$. The pump beam parameters were the same as those stated for the high-finesse OPO.

Figure 10:
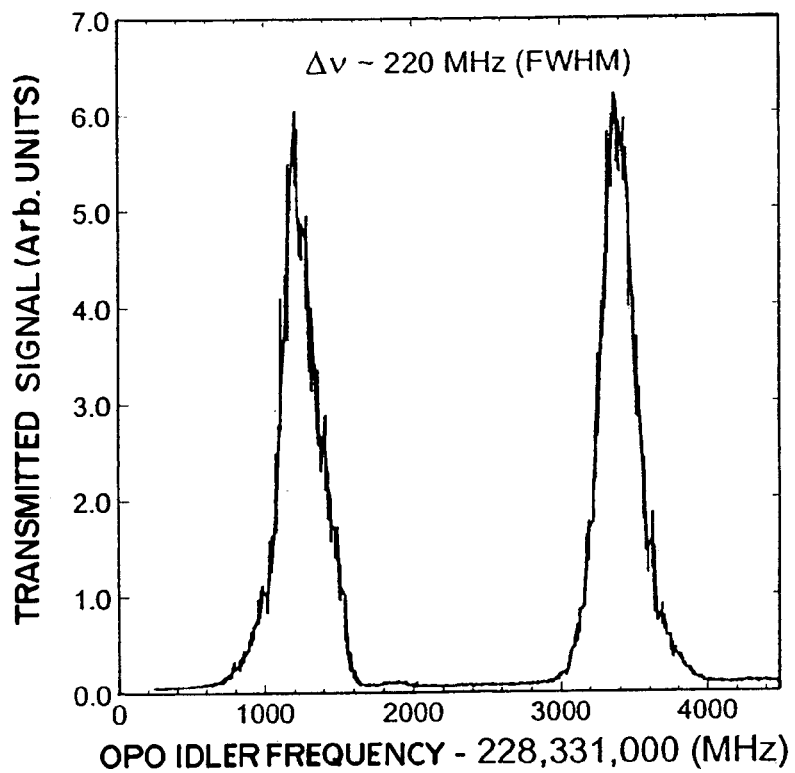
FIG. 10 shows a spectrum analyzer trace for the pulsed idler radiation from the low-finesse OPO.

The frequency bandwidth of the low-finesse OPO was measured using a spectrum analyzer (Burleigh Instruments Inc., Fishers, N.Y., Model SAPlus Laser Spectrum Analyzer) with a free-spectral-range (FSR) of 2 GHz and a finesse of 200. The DFB seed laser was scanned over the etalon transmission peaks for the spectrum analyzer. The results shown in FIG. 10 are consistent with results expected based on the acetylene absorption measurements. The frequency bandwidth of the idler radiation from the low-finesse OPO is approximately 220±20 MHz FWHM based on several scans similar to that shown in FIG. 10.

Although the frequency bandwidth may be slightly larger for the OPO systems compared to an OPG system, the advantage of using the OPO is that the signal and idler pulse energies from the two-crystal OPO are much higher than for the two-crystal OPG. For the OPO systems, much lower 355-nm pulse energies were used than were used for the OPG system. The energies that were used to pump the OPO systems were conservative, in order to prevent possible optical damage in the experimental system, however it is anticipated that systems can be designed to operate at higher pump powers.

DFB-seeded lasers may have a more limited bandwidth than, for example, dye laser systems. However, the wavelength coverage of the configuration shown in FIG. 8 may be extended by a number of approaches, some of which are now described.

For the systems disclosed herein, the near-infrared DFB lasers scan approximately 4 nm. For example, the 1535-nm DFB laser scans, in a single-mode state, from 1534 to 1538 nm, which corresponds to a tuning range of 500 GHz. As the idler wavelength is scanned from 1534 nm 1538 nm, the signal wavelength is correspondingly scanned from 461.6 nm to 461.2 nm. OPG or OPO systems may also be seeded with external cavity diode lasers (ECDLs), which would allow operation over a greater range of wavelengths than for the DFB lasers, but the mode-hop-free tuning range of each ECDL is, in general, less than for the DFB lasers.

Figure 11:
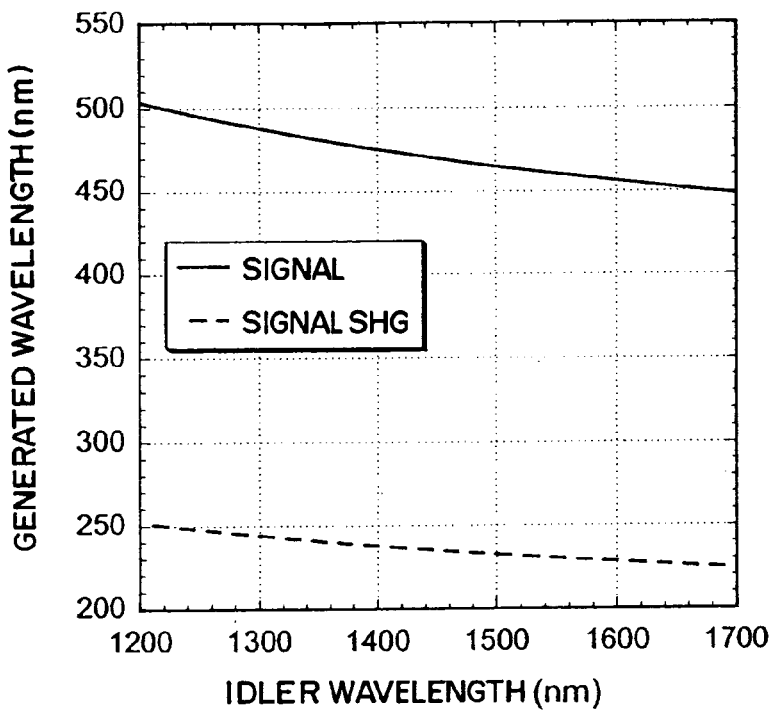
FIG. 11 shows the dependence of the signal wavelength on the idler wavelength for an injection-seeded optical parametric system pumped by the Nd:YAG laser third harmonic output at 355 nm.
Figure 12:
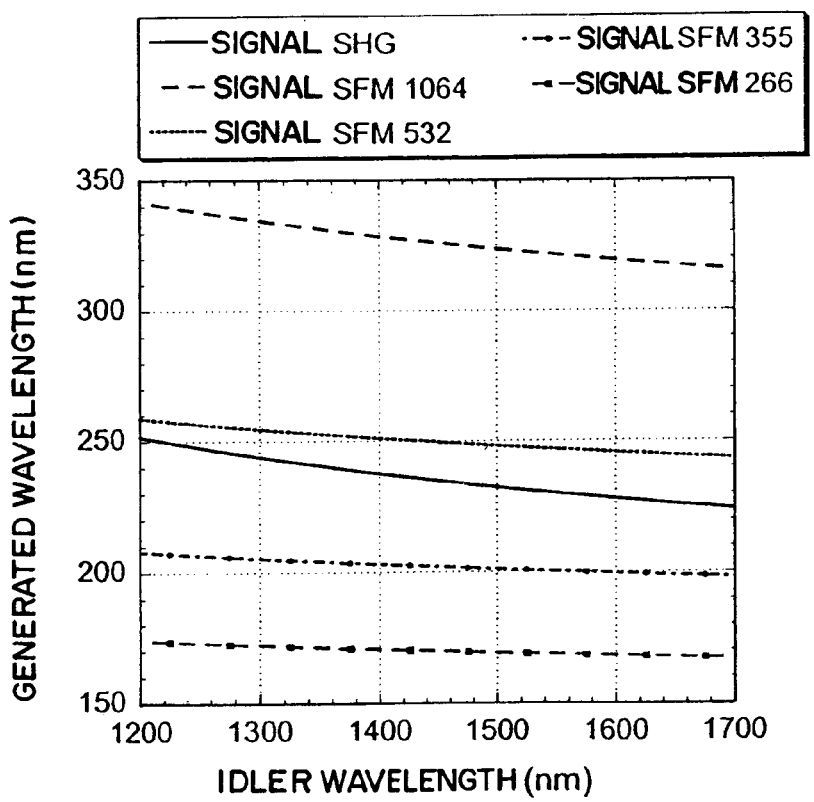
FIG. 12 shows the range of wavelengths that can be obtained by sum-frequency-mixing of the signal output with various harmonic outputs of the Nd:YAG laser. The calculations are performed for an injection-seeded optical parametric system pumped by the Nd:YAG laser third harmonic output at 355 nm. The frequency-doubled wavelength of the signal output is also shown.
Figure 13:
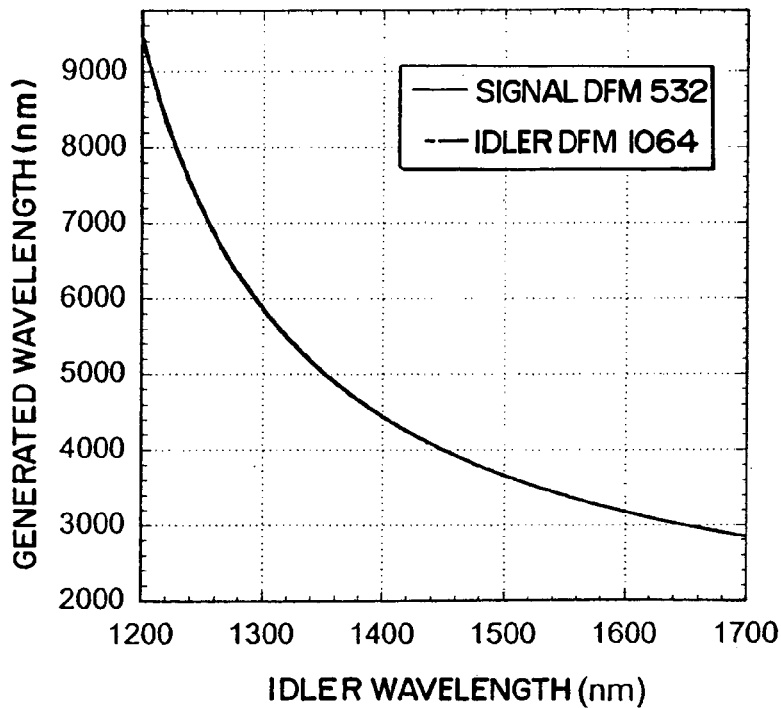
FIG. 13 shows the range of wavelengths that can be obtained by difference-frequency-mixing of the signal or idler outputs with the 532 nm and 1064 nm outputs, respectively, of the Nd:YAG laser. The calculations are performed for an injection-seeded optical parametric system pumped by the Nd:YAG laser third harmonic output at 355 nm.
Figure 14:
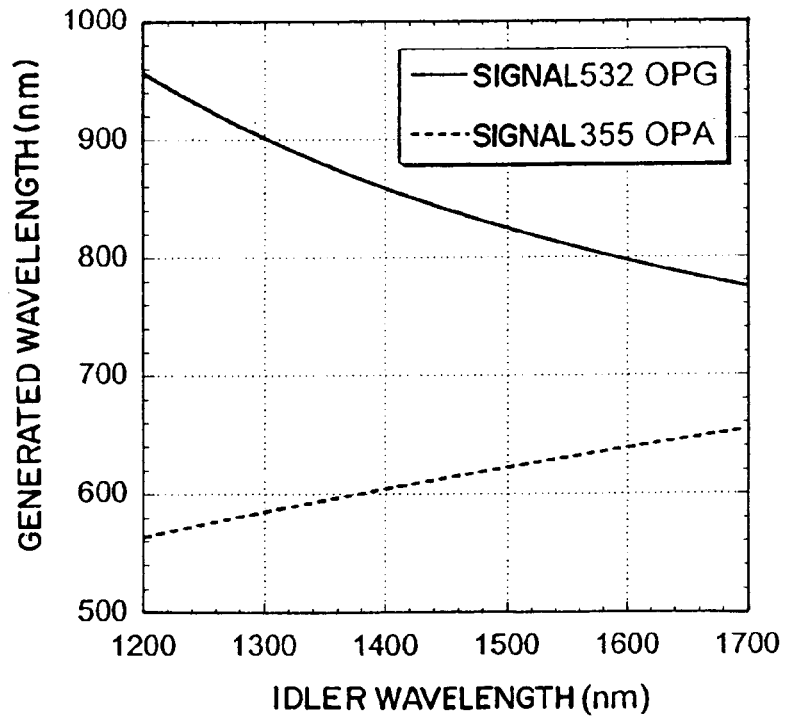
FIG. 14 shows the range of wavelengths that can be obtained by using an OPG/OPO stage pumped by the 532 nm output of the Nd:YAG laser and an OPA stage pumped by the 355 nm output of the Nd:YAG laser.

Near-infrared DFB lasers compatible with the laser driver and control electronics which were used in the apparatus described in FIG. 8 are available at wavelengths from 1200 nm to 1700 nm from NEL America, Inc. The range of wavelengths that can be covered using DFB seed lasers between 1200 nm and 1700 nm is illustrated in FIGS. 11-14. The wavelength range for the signal wavelength and the second-harmonic of the signal wavelength is shown in FIG. 11. As the idler wavelength is varied from 1200 to 1700 nm, the signal wavelength varies from 503.75 nm to 448.40 nm, respectively. The range of wavelengths that can be covered by frequency doubling the signal radiation is also shown in FIG. 11 as the dashed curve SHG. FIG. 12 shows the range of wavelengths that can be obtained by sum-frequency-mixing of the signal output with various harmonic outputs of the Nd:YAG laser. The potential of the system for producing tunable, single-mode pulse laser radiation throughout the mid-infrared is shown in FIG. 13. Difference frequency mixing (DFM) between the idler beam from the OPL system and the 1064.43-nm fundamental output of the Nd:YAG laser could also be used to generate mid-infrared laser radiation from 9420 nm to 2850 nm for idler wavelengths ranging from 1200 nm to 1700 nm, respectively, provided that suitable DFM crystals can be obtained. This same range of wavelengths could then be covered by the DFM process for the signal beam from the OPL system and the 532.22-nm second harmonic output of the Nd:YAG laser.

Another method of increasing the spectral coverage would be to pump the OPO/OPG stage of the OPL system with the 532.22-nm output of the Nd:YAG laser. This results in signal outputs ranging from 956 nm to 775 nm for the OPG/OPO. The OPL system could be operated with a 532-nm pump for the OPA, but it could also be operated with a 355-nm pump for the OPA. For the OPA pumped by the 355-nm beam, the signal beam from the OPG/OPO serves as the idler beam for the OPA, and signal wavelengths ranging from 564 nm to 655 nm can be obtained. This is a useful wavelength range for techniques such as coherent anti-Stokes Raman scattering (CARS). The frequency difference between 532.22-nm second harmonic of the Nd:YAG laser and the OPA signal radiation corresponds, for example, to a Raman shift range from 1059 to 3522 $cm^{-1}$.

An injection-seeded OPG/OPA and OPO/OPA based on 355-nm pumping of β-BBO crystals has been described. The signal and idler radiation from the OPL systems is single-mode and exhibits smooth temporal profiles. The measured frequency bandwidth of the idler radiation from both systems was approximately 200 MHz, although perhaps slightly greater than that for the OPO/OPA systems. The frequency bandwidth of the signal radiation is expected be similar to the frequency bandwidth of the idler radiation because of the nature of the optical parametric generation process. Tuning of the signal and idler wavelengths can be accomplished, for example, by changing the DFB laser temperature or current. The tuning of the OPL system may be conducted under computer control. Rapid tuning of the DFB may be possible under current control.

An injection-seeded OPO system has been described with a feedback cavity at other than the wavelength with which the cavity seeded. The OPO systems herein are seeded at an idler wavelength, whereas the mirrors that are placed around the β-BBO crystals provide feedback at an output signal wavelength. These OPO systems demonstrate excellent conversion efficiency, single-mode operation, and little if any broadening of the frequency bandwidth when compared to OPG operation without the cavity. Piezoelectric movement of the cavity mirrors or cavity locking electronics are not required, simplifying the assembly and operation of the OPL system.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. An optical device, comprising:
    a non-linear optical material;
    a first laser input port;
    a second laser input port; and
    a first optical element disposed opposing an input face of the non-linear material, and a second optical element disposed opposing an output face of the non-linear material,
    wherein a first product of reflectivities of the first optical element and the second optical element at an output wavelength of the non-linear optical material is greater than a second product of reflectivities of the first and the second optical elements at a wavelength of the first input port and a wavelength of the second input port.

2. The apparatus of claim 1, wherein a first laser communicates with the first input port, the laser providing a continuous wave signal at a first wavelength that is not the output wavelength.

3. The apparatus of claim 2, wherein a second laser communicates with the second input port, the laser providing a pulse signal at a second wavelength that is not the output wavelength.

4. The apparatus of claim 3, wherein the first and the second wavelengths are unequal.

5. The apparatus of claim 1, wherein the non-linear optical material is beta barium borate (β-BBO).

6. The apparatus of claim 1, wherein the reflectivity of the first element at the output wavelength is substantially 100 percent, and the reflectivity of the second optical element at the output wavelength is greater than approximately 50 percent.

7. The apparatus of claim 1, wherein the second optical element is a wedged glass flat.

8. The apparatus of claim 1, wherein the first product of reflectivities is substantially greater than the second product of reflectivities.

9. The apparatus of claim 1, wherein a pulsed laser is connected to the second input port.

10. The apparatus of claim 1, wherein a continuous wave laser is connected to the first input port.

11. The apparatus of claim 10, wherein a central wavelength of the continuous wave laser is variable.

12. An optical parametric laser assembly, comprising:
    a beamsplitter disposed to produce a first optical output and a second optical output;
    a first laser input port communicating with the beamsplitter;
    a second laser input port;
    an optical delay;
    an optical parametric oscillator (OPO), further comprising:
        a first non-linear optical material; and
        a first optical element disposed opposing an input face of the first non-linear material, and a second optical element disposed opposing an output face of the first non-linear material,
    wherein a first product of reflectivities of the first optical element and the second optical element at an output wavelength of the first non-linear optical material is greater than a second product of reflectivities of the first and the second optical elements at at least one of a wavelength of the first input port or a wavelength of the second input port; and
    an optical parametric amplifier (OPA), further comprising:
        a second non-linear optical material; and
        a third input port,
        wherein the optical delay is disposed between the beamsplitter second optical output and the third input port, and the beamsplitter first optical output and the second optical port communicate with the first optical element.

13. The assembly of claim 12, wherein at least one of the first non-linear optical material or the second non-linear optical material is beta barium borate (β-BBO).

14. An optical parametric laser system, comprising:
a beamsplitter disposed to produce a first optical output and a second optical output;
a first laser communicating with the beamsplitter;
a second laser;
an optical delay;
an optical parametric oscillator (OPO), further comprising:
a first non-linear optical material; and
a first optical element disposed opposing an input face of the first non-linear material, and a second optical element disposed opposing an output face of the first non-linear material,
wherein a first product of reflectivities of the first optical element and the second optical element at an output wavelength of the first non-linear optical material is substantially greater than a second product of reflectivities of the first and the second optical elements at a wavelength of the first input port and a wavelength of the second input port; and
an optical parametric amplifier (OPA), further comprising:
a second non-linear optical material; and
a third input port,
wherein the optical delay is disposed between the beamsplitter second optical output and the third input port; the beamsplitter first optical output and the second laser communicate with the first optical element.

15. The assembly of claim 14, wherein at least one of the first non-linear optical material or the second non-linear optical material is beta barium borate (β-BBO).

16. The apparatus of claim 14, wherein the reflectivity of the first element at the output wavelength is substantially 100 percent, and the reflectivity of the second optical element at the output wavelength is greater than approximately 50 percent.

17. The apparatus of claim 14, wherein the second optical element is a wedged glass flat.

18. A method of generating optical signals, the method comprising:
generating a first laser signal;
generating a second laser signal;
disposing a first non-linear optical material between a first and a second optical element; and
directing the first and the second laser signals onto the first optical element;
wherein a first product of the reflectivities of the first and the second optical elements at an output frequency is greater than a second product of the reflectivities of the first and the second optical elements at a frequency of the first laser and a frequency of the second laser.

19. The method of claim 18, further comprising:
splitting the first laser signal into a first signal and a second signal;
directing the first signal onto the first optical element;
time delaying the second signal;
disposing a second non-linear optical material on an opposite side of the second optical element from the first non-linear optical material; and
directing the second signal onto the second non-linear material such that the first signal and the second signal are collinear.

20. The method of claim 19, wherein the time delay of the second signal has a value such that a value of a time delay of the first optical signal and the value of the time delay of second optical signal are equal at an input of the second non-linear optical material.

21. An optical parameter oscillator, comprising:
means for providing pulse energy at a first optical frequency;
means for providing a seeding energy at a second optical frequency;
a non-linear optical material; and
means for providing feedback in the non-linear material at an output optical frequency where the feedback at the output optical frequency is greater than the feedback at the first and second optical frequencies.

* * * * *